A. L. ELLIS.
TRACTOR.
APPLICATION FILED JULY 2, 1918.

1,288,538.

Patented Dec. 24, 1918.
3 SHEETS—SHEET 3.

INVENTOR
A. L. ELLIS
BY F. M. Wright
ATT'Y.

UNITED STATES PATENT OFFICE.

ALDEN L. ELLIS, OF SUNNYVALE, CALIFORNIA.

TRACTOR.

1,288,538.   Specification of Letters Patent.   Patented Dec. 24, 1918.

Application filed July 2, 1918. Serial No. 242,934.

*To all whom it may concern:*

Be it known that I, ALDEN L. ELLIS, a citizen of the United States, residing at Sunnyvale, in the county of Santa Clara and State of California, have invented new and useful Improvements in Tractors, of which the following is a specification.

The present invention relates to improvements in tractors of the track-laying type.

One object of the invention is to provide a tractor having a track of such form and construction as to require no oil. When a track is oiled, the oil, mixing with the dirt, gravel and the like with which it comes into contact, forms a grit-like substance and greatly abrades and injures the parts of the track with which it comes in contact.

A further object is to provide in such a tractor a track which is self-cleaning.

A further object is to provide a tractor which will dispense with the necessity of differential action on the opposite sides of the tractor.

A further object of the invention is to provide a construction whereby the operating mechanism of the tractor may be entirely inclosed, thus rendering it dust-proof and greatly increasing its efficiency and lengthening its life.

A further object is to provide simple and inexpensive mechanism for propelling the tractor.

Figure 1:
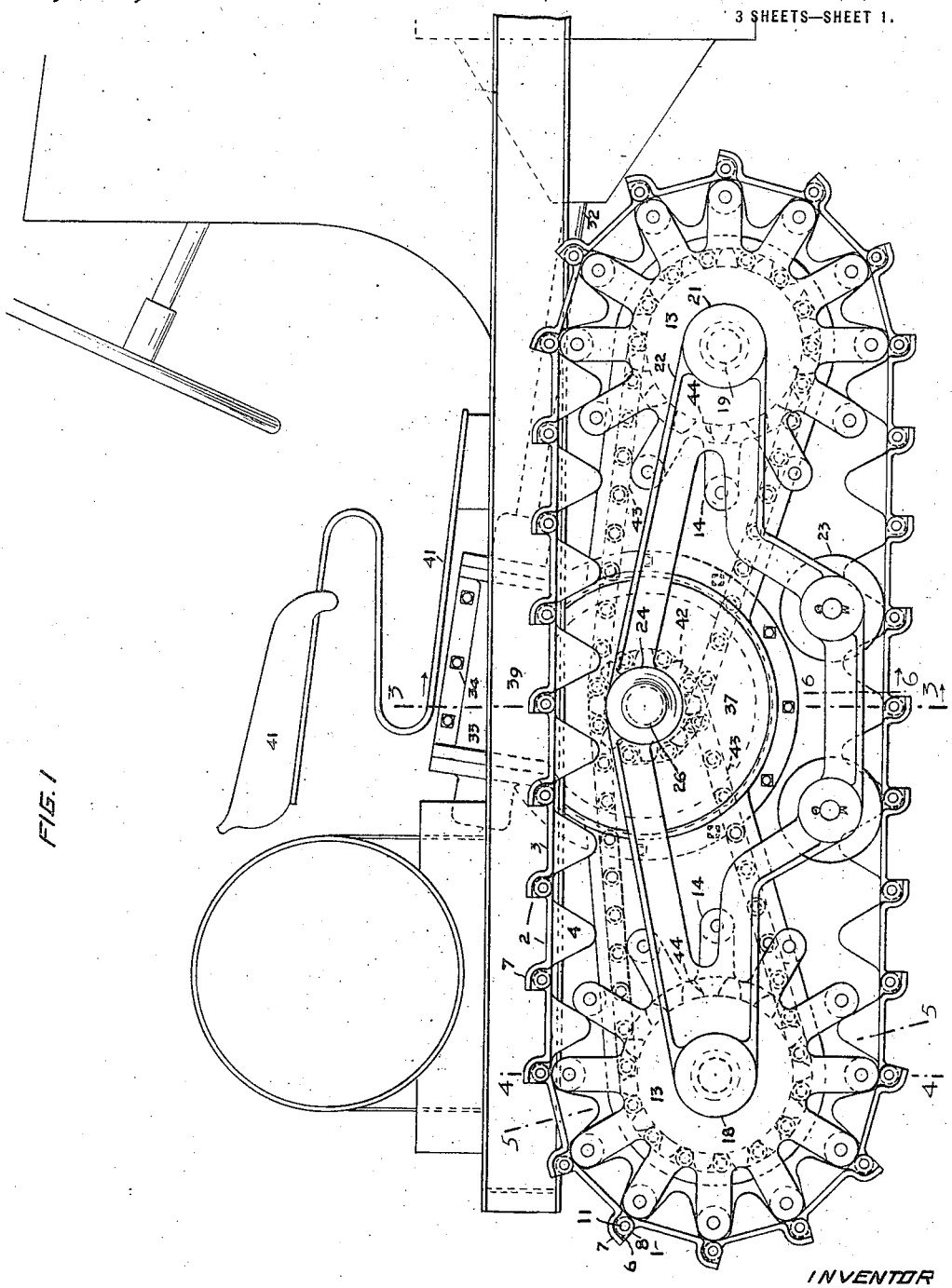
Figure 2:
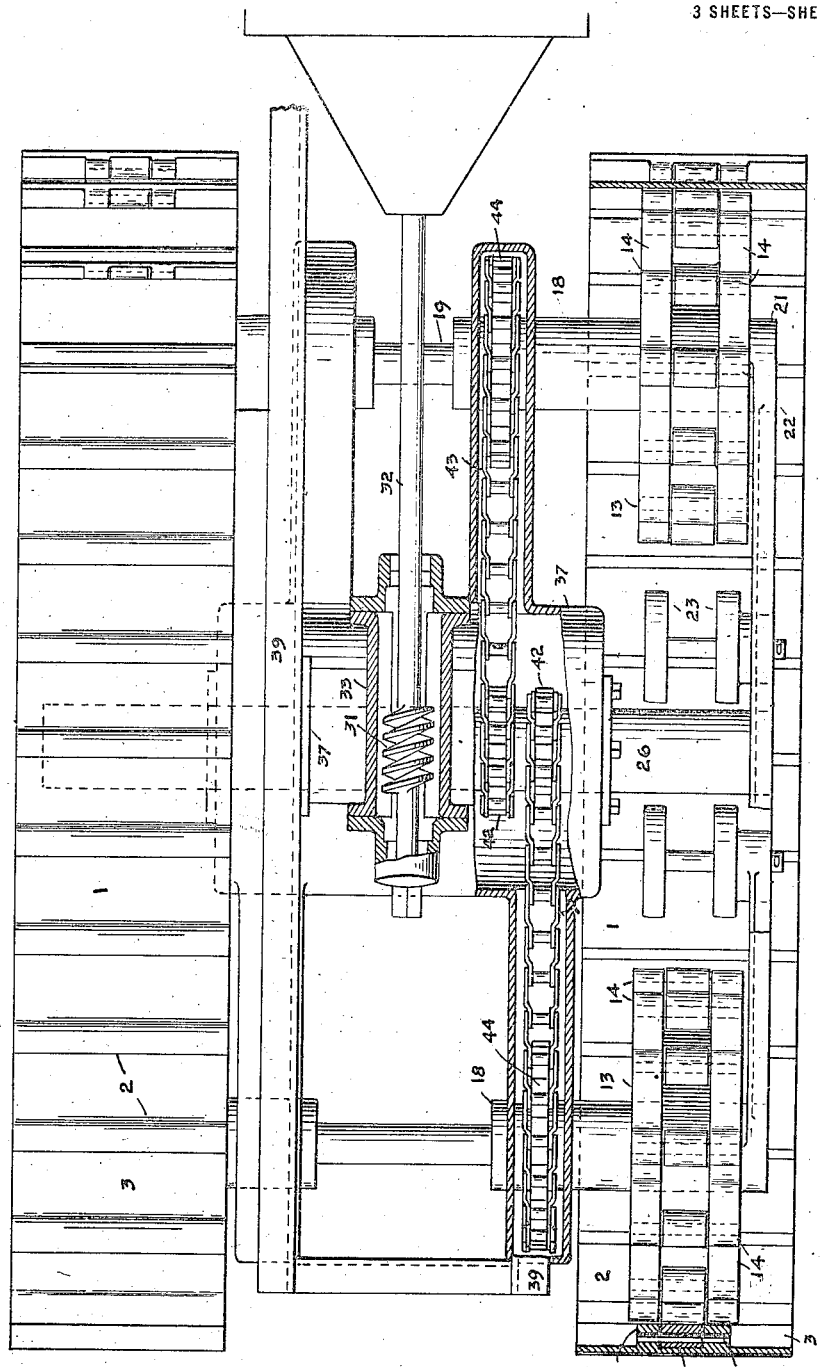
Figure 3:
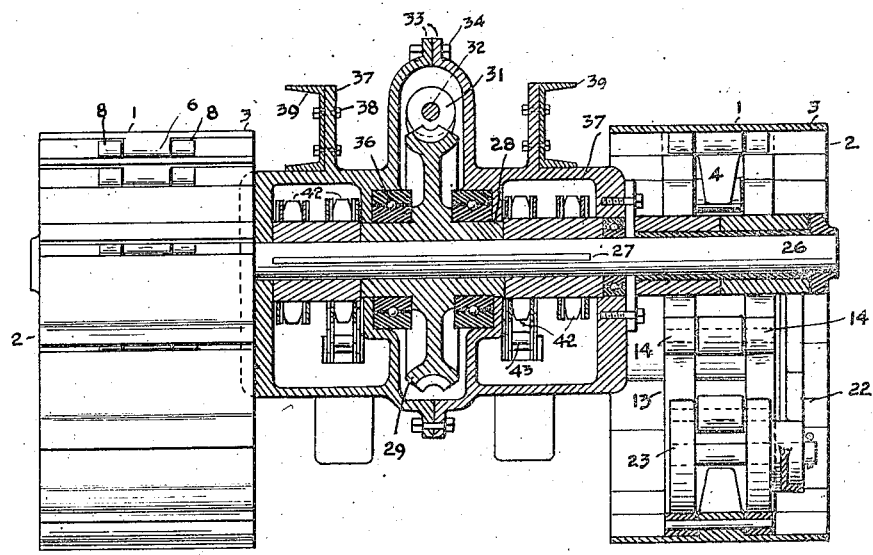
Figure 4:
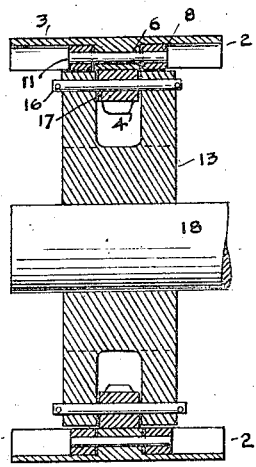
Figure 5:
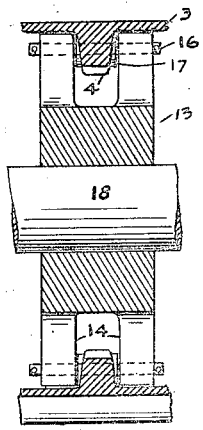
Figure 6:
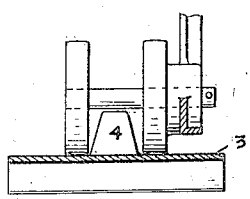

In the accompanying drawings, Figure 1 is a side elevation of a portion of my improved tractor, a front portion thereof being omitted; Fig. 2 is a broken plan view of the same; Figs. 3, 4, 5, 6, are transverse sections on the lines 3—3, 4—4, 5—5, 6—6, respectively of Fig. 1.

Referring to the drawing, 1 indicates endless chains or treads, one on each side of the tractor. Said chains are composed of links 2, each link comprising a plate 3 having at one end outwardly extending spaced knuckles 8 and at the other end a housing 7 for said knuckles 8 extending the full width of the plate and having integral therewith a central knuckle 6, through which and the knuckles 8 of an adjacent link extends a pintle 11.

Said links 2 travel around, and support, front and rear sprocket wheels 13, each of which is formed with sprocket teeth 14 in pairs, the sprocket teeth of each pair being on opposite sides of the wheel, shafts 16 extending between the sprocket teeth of each pair and carrying rollers 17, said rollers engaging the bosses 4 and the knuckle 6 on the links. Said sprocket wheels are mounted on sleeves 18 which surround, and are attached to, shafts 19, the ends of each shaft being contained in the recesses 21 of frames 22. Said frames are also supported upon rollers 23 which engage the links of the lower central portions of said endless chains.

Said frames also contain bearings 24 for the ends of a transverse shaft 26, to the central portion of which is keyed, as shown at 27, the hub 28 of a worm wheel 29 which is engaged by a worm 31 on a forwardly extending shaft 32, the forward end of which is connected with a transmission connected to the shaft of an internal combustion engine, the transmission and engine of any common construction not being here shown. Said worm 31, worm shaft 32, and worm wheel 29 are mounted in a casing which consists of two casing sections 33 bolted together, as shown at 34, and supported by ball bearings 36 upon the hub 28 of the worm wheel, said sections having lateral extensions 37 which are secured, as shown at 38, to channel irons 39 which support the seat 41 and other portions of the tractor. In each extension 37 are contained sprocket wheels 42 also keyed to the shaft 26 and around said sprocket wheels travel sprocket chains 43 which also travel around sprocket wheels 44 on the sleeves 18.

Thus by the rotation of said shaft 32 the worm wheel 29 is also rotated, rotating the sprocket wheels 42, imparting rotation to the sleeves 18 and thus to the driving sprocket wheels 13, and thus causing the treads or endless chains to advance.

The teeth or bosses 4 of the track tend to remove any dirt that might lodge between the teeth 14 of the sprocket wheels and the rollers 17, by pushing said dirt between the opposite teeth of each pair between the main body of the wheel and the roller.

It will be observed that, on account of the two tracks on opposite sides of the tractor being so close together, they act as a unit, so that no differential action on the driving wheels is required to turn the tractor, but the tractor turns as if it were moving on a single track.

I claim:

1. A tractor having sprocket wheels each comprising pairs of sprocket teeth extending parallel with each other in the same direction from opposite sides of the wheel, rollers mounted between the ends of the sprocket teeth of the several pairs, and endless tracks composed of links having bosses extending inwardly therefrom between successive rollers.

2. A tractor having sprocket wheels each comprising pairs of sprocket teeth extending parallel with each other in the same direction from opposite sides of the wheel, rollers mounted between the ends of the sprocket teeth of the several pairs, and endless tracks composed of links having bosses extending inwardly therefrom between successive rollers and each having at one end a central knuckle engaging one of said rollers.

3. A tractor comprising a transverse shaft, means for rotating said shaft, sprocket wheels secured to said shaft on each side of its center and rotating therewith, sprocket chains around the respective sprocket wheels and extending forwardly and rearwardly therefrom, frames supporting said shaft, driving sprocket wheels, shafts therefor, ends of which are supported in said frames and rotated by said sprocket chains, and endless tracks engaging the driving sprocket wheels.

4. A tractor comprising a transverse shaft, means for rotating said shaft, sprocket wheels secured to said shaft on each side of its center, and rotating therewith, sprocket chains around the respective sprocket wheels and extending forwardly and rearwardly therefrom, driving wheels, shafts therefor, ends of which are supported in said frames and rotated by said sprocket chains, endless tracks around the driving wheels, and a casing fitted closely around said shafts and entirely inclosing the chains and the sprocket wheels around which they travel.

ALDEN L. ELLIS.